United States Patent
Chou et al.

(10) Patent No.: US 7,342,859 B2
(45) Date of Patent: Mar. 11, 2008

(54) OPTICAL RECORDING SYSTEM CAPABLE OF SWITCHING FROM A CONSTANT ANGULAR VELOCITY RECORDING MODE TO A CONSTANT LINEAR VELOCITY RECORDING MODE

(75) Inventors: Tzu-Ming Chou, Taipei Hsien (TW); Yao-Lung Chuang, Taipei Hsien (TW)

(73) Assignee: Mediatek, Inc., Hsin-Chu (TW)

( * ) Notice: Subject to any disclaimer, the term of this patent is extended or adjusted under 35 U.S.C. 154(b) by 592 days.

(21) Appl. No.: 10/986,920

(22) Filed: Nov. 15, 2004

(65) Prior Publication Data

US 2005/0141371 A1 Jun. 30, 2005

(30) Foreign Application Priority Data

Dec. 25, 2003 (TW) ............................... 92136873 A

(51) Int. Cl.
*G11B 7/00* (2006.01)
(52) U.S. Cl. .................................. 369/53.45; 369/47.38
(58) Field of Classification Search ............. 369/53.45, 369/47.49, 47.38, 47.3
See application file for complete search history.

(56) References Cited

U.S. PATENT DOCUMENTS 5,881,038 A * 3/1999 Oshima et al. .......... 369/47.12
2002/0003761 A1    1/2002 Jin

* cited by examiner

*Primary Examiner*—Nabil Hindi
(74) *Attorney, Agent, or Firm*—Thomas, Kayden, Horstemeyer & Risley

(57) ABSTRACT

In an optical recording system, according to a wobble sync signal obtained from a wobble signal associated with a physical track of a recording medium being recorded with input data by a recording module operated in a default constant angular velocity (CAV) recording mode, operation of the recording module can be switched from the CAV recording mode to a constant linear velocity (CLV) recording mode by a mode control switch. The mode control switch is forced to switch operation of the recording module to the CLV recording mode when result of a comparison between a write clock signal generated from the wobble sync signal when the recording module is operated by the mode control switch in the CAV recording mode, and a threshold signal corresponding to a threshold recording speed in the CAV recording mode indicates that the recording mode should be switched to the CLV recording mode but the mode control switch still keep the recording module staying in the CAV recording mode.

9 Claims, 4 Drawing Sheets

OPTICAL RECORDING SYSTEM CAPABLE OF SWITCHING FROM A CONSTANT ANGULAR VELOCITY RECORDING MODE TO A CONSTANT LINEAR VELOCITY RECORDING MODE

CROSS-REFERENCE TO RELATED APPLICATION

This application claims priority of Taiwanese Application No. 092136873, filed on Dec. 25, 2003.

BACKGROUND OF THE INVENTION

1. Field of the Invention

The invention relates to an optical recording system, more particularly to an optical recording system capable of switching from a constant angular velocity recording mode to a constant linear velocity recording mode.

2. Description of the Related Art

A conventional optical recording device can be operated in two recording modes, i.e., constant angular velocity (CAV) recording mode and constant linear velocity (CLV) recording mode. In the CLV recording mode, the rotation speed of the spindle motor is decreased in proportion to a radius of a disc as a recording point goes outward such that data recording needs much time. In the CAV recording mode, the recording speed is increased in proportion to a radius of a disc as a recording point goes outward. However, if the recording speed is faster than a threshold recording speed, data recorded on the disc cannot be read as a result of erroneous or incomplete recording of data.

Therefore, in order to solve the above problems, U.S. Patent Publication No. US-2002-0003761 discloses a method of changing a recording mode, in which a recording speed is detected from a wobble signal reproduced while recording data to a writable disc in the CAV recording mode, and a change from the CAV recording mode to the CLV recording mode is conducted if the detected recording speed exceeds a predetermined threshold.

However, when a spindle motor for driving rotation of the writable disc rotates unstably such that a poor wobble signal may be reproduced, the exact recording speed cannot be detected, and precise changing from the CAV recording mode to the CLV recording mode cannot be ensured.

SUMMARY OF THE INVENTION

Therefore, the object of the present invention is to provide an optical recording system that can eliminate the aforesaid drawbacks of the prior art.

According to one aspect of the present invention, an optical recording system comprises:

a recording module for recording input data to a recording medium;

a wobble signal generator adapted for reproducing a wobble signal associated with a physical track of the recording medium being recorded with the input data by the recording module;

a wobble signal demodulator coupled to the wobble signal generator for demodulating the wobble signal so as to obtain a wobble sync signal therefrom;

a mode control switch coupled to the recording module and the wobble signal demodulator, the mode control switch being operable so as to switch operation of the recording module from a default constant angular velocity (CAV) recording mode to a constant linear velocity (CLV) recording mode in accordance with the wobble sync signal from the wobble signal demodulator;

a write clock signal generator coupled to the wobble signal demodulator for receiving the wobble sync signal therefrom, the write clock signal generator being further coupled to the mode control switch and generating a write clock signal from the wobble sync signal when the recording module is operated by the mode control switch in the CAV recording mode; and a processor unit coupled to the write clock signal generator and the mode control switch.

The processor unit receives the write clock signal and compares the write clock signal with a threshold signal corresponding to a threshold recording speed in the CAV recording mode. The processor unit forces the mode control switch to switch operation of the recording module to the CLV recording mode when result of the comparison performed by the processor unit indicates that the recording mode should be switched to the CLV recording mode but the mode control switch still keep the recording module staying in the CAV recording mode.

According to another aspect of the present invention, an optical recording method comprises the steps of:

(a) operating a recording module in a default constant angular velocity (CAV) recording mode for recording input data to a recording medium;

(b) reproducing a wobble signal associated with a physical track of the recording medium being recorded with the input data by the recording module;

(c) demodulating the wobble signal so as to obtain a wobble sync signal therefrom;

(d) enabling a mode control switch to switch operation of the recording module from the CAV recording mode to a constant linear velocity (CLV) recording mode in accordance with the wobble sync signal;

(e) generating a write clock signal from the wobble sync signal when the recording module is operated by the mode control switch in the CAV recording mode; and (f) comparing the write clock signal with a threshold signal corresponding to a threshold recording speed in the CAV recording mode, and forcing the mode control switch to switch operation of the recording module to the CLV recording mode when result of the comparison performed in step (f) indicates that the recording mode should be switched to the CLV recording mode but the mode control switch still keep the recording module staying in the CAV recording mode.

According to a further aspect of the present invention, there is provided a switch controller for an optical recording system that includes a recording module for recording input data to a recording medium, a wobble signal generator for reproducing a wobble signal associated with a physical track of the recording medium being recorded with the input data by the recording module, a wobble signal demodulator coupled to the wobble signal generator for demodulating the wobble signal so as to obtain a wobble sync signal therefrom, and a mode control switch coupled to the recording module and the wobble signal demodulator, the mode control switch being operable so as to switch operation of the recording module from a default constant angular velocity (CAV) recording mode to a constant linear velocity (CLV) recording mode in accordance with the wobble sync signal from the wobble signal demodulator.

The switch controller comprises:

a write clock signal generator adapted to receive the wobble sync signal from the wobble signal demodulator, the write clock signal generator being adapted to be coupled to the mode control switch, and generating a write clock signal from the wobble sync signal when the recording module is operated by the mode control switch in the CAV recording mode; and a processor unit coupled to the write clock signal generator and adapted to be coupled to the mode control switch.

The processor unit receives the write clock signal and compares the write clock signal with a threshold signal corresponding to a threshold recording speed in the CAV recording mode. The processor unit is adapted to force the mode control switch to switch operation of the recording module to the CLV recording mode when result of the comparison performed by the processor unit indicates that the recording mode should be switched to the CLV recording mode but the mode control switch still keep the recording module staying in the CAV recording mode.

According to still another aspect of the present invention, there is provided a switch control method for an optical recording system that includes a recording module for recording input data to a recording medium, a wobble signal generator for reproducing a wobble signal associated with a physical track of the recording medium being recorded with the input data by the recording module, a wobble signal demodulator coupled to the wobble signal generator for demodulating the wobble signal so as to obtain a wobble sync signal therefrom, and a mode control switch coupled to the recording module and the wobble signal demodulator, the mode control switch being operable so as to switch operation of the recording module from a default constant angular velocity (CAV) recording mode to a constant linear velocity (CLV) recording mode in accordance with the wobble sync signal from the wobble signal demodulator.

The switch control method comprises the steps of:
(1) generating a write clock signal from the wobble sync signal when the recording module is operated by the mode control switch in the CAV recording mode; and
(2) comparing the write clock signal with a threshold signal corresponding to a threshold recording speed in the CAV recording mode, and forcing the mode control switch to switch operation of the recording module to the CLV recording mode when result of the comparison performed in step (2) indicates that the recording mode should be switched to the CLV recording mode but the mode control switch still keep the recording module staying in the CAV recording mode.

BRIEF DESCRIPTION OF THE DRAWINGS

Other features and advantages of the present invention will become apparent in the following detailed description of the preferred embodiment with reference to the accompanying drawings, of which.

DETAILED DESCRIPTION OF THE PREFERRED EMBODIMENT

Figure 1:
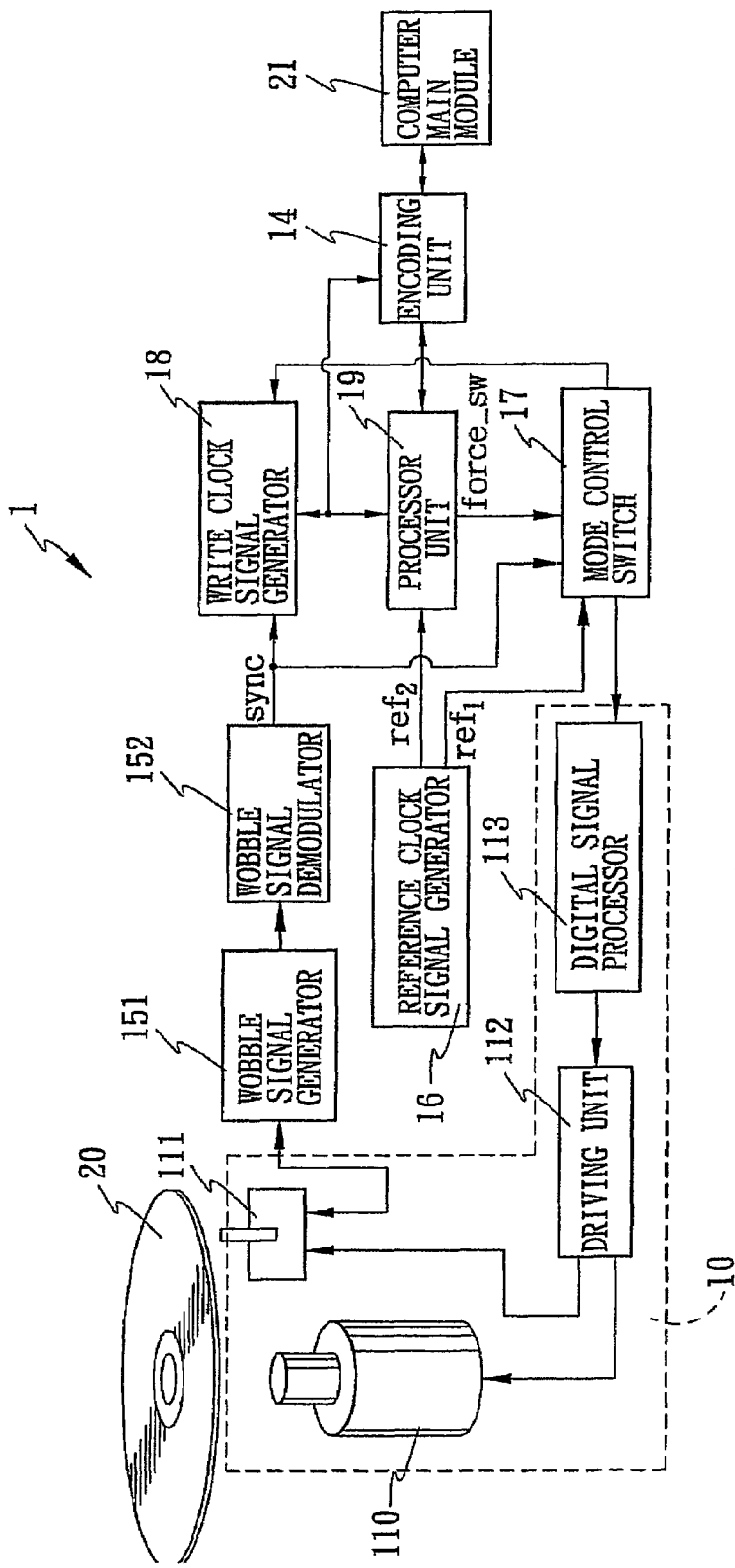
FIG. 1 is a schematic circuit block diagram illustrating an optical recording system for implementing the preferred embodiment of an optical recording method according to the present invention.

FIG. 1 illustrates an optical recording system 1 for implementing the preferred embodiment of an optical recording method according to the present invention. The optical recording system 1 includes a recording module, a wobble signal generator 151, a wobble signal demodulator 152, a mode control switch 17, a write clock signal generator 18, a process or unit 19, and an encoding unit 14.

In this embodiment, the recording module 11, which is conventional in construction, is operable so as to record input data to a recording medium 20, such as a writable optical disc, and includes a spindle motor 110 for rotating the optical medium 20, an optical pickup 111, a driving unit 112 coupled to the spindle motor 10 and the optical pickup 111 for driving the spindle motor 110 and the optical pickup 111, and a digital signal processor 113 coupled to the driving unit 112.

The wobble signal generator 151 is coupled to the optical pickup 111, and is adapted for reproducing a wobble signal associated with a physical track of the recording medium 20 being recorded with the input data by the recording module 111 in a conventional manner. In this embodiment, the wobble signal is in the form of ATIP-framed data that includes sync information.

The wobble signal demodulator 152 is coupled to the wobble signal generator 151 for demodulating the wobble signal so as to obtain a wobble sync signal (sync) therefrom in a known manner.

The mode control switch 17 is coupled to the recording module 11 and the wobble signal demodulator 152. The mode control switch 17 is operable so as to switch operation of the recording module 11 from a default constant angular velocity (CAV) recording mode to a constant linear velocity (CLV) recording mode in accordance with the wobble sync signal (sync) from the wobble signal demodulator 152. In this embodiment, the mode control switch 17 switches operation of the recording module 11 from the CAV recording mode to the CLV recording mode when a frequency difference between the wobble sync signal (sync), and a reference clock signal (ref1) generated from a reference clock signal generator 16, which is coupled to the mode control switch 17, and corresponding to a specific recording speed in the CAV recording mode is less than a predetermined frequency difference.

Figure 2:
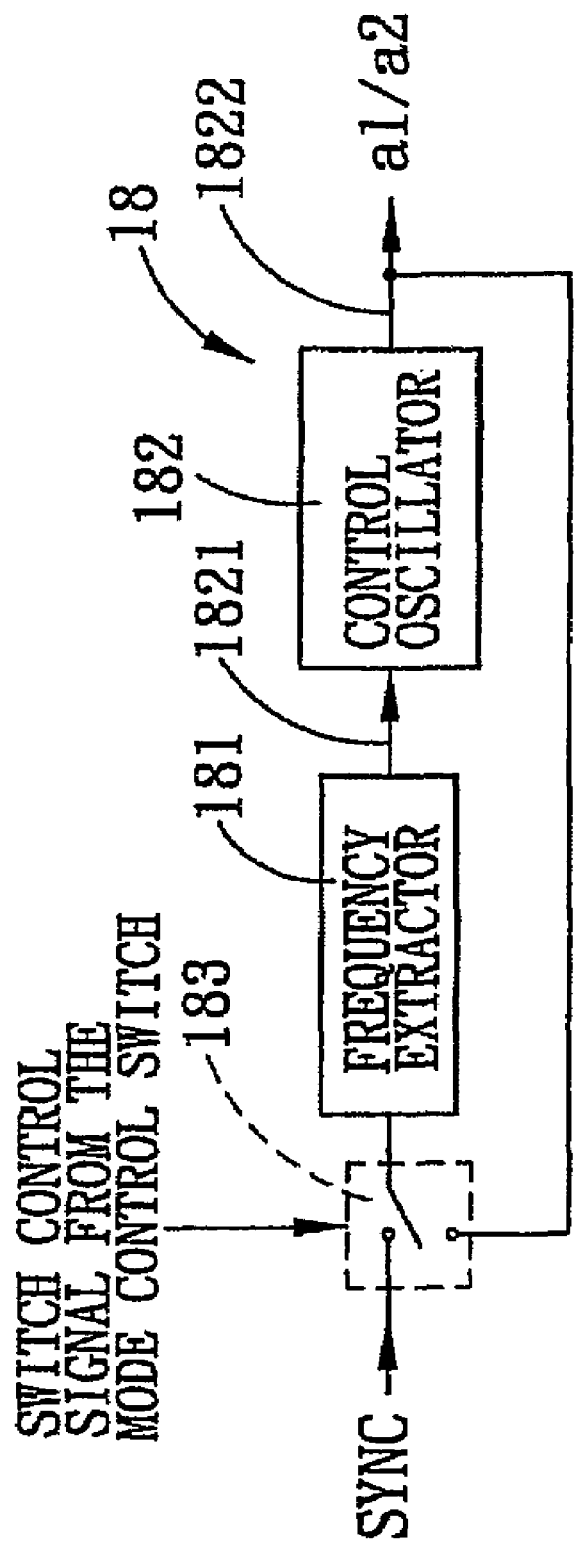
FIG. 2 is a schematic circuit block diagram illustrating a write clock signal generator of the preferred embodiment.

The write clock signal generator 18 is coupled to the wobble signal demodulator 152 for receiving the wobble sync signal (sync) therefrom. The write clock signal generator 18 is further coupled to the mode control switch 17, and generates a first write clock signal (a1) from the wobble sync signal (sync) when the recording module 11 is operated by the mode control switch 17 in the CAV recording mode. In this embodiment, as shown in FIG. 2, the write clock signal generator 18 includes a frequency extractor 183, a control oscillator 182 and a control switch 183. The control oscillator 182 has an input 1821 coupled to the frequency extractor 183, and an output 1822. The control switch 183 is coupled to the wobble signal demodulator 152, the frequency extractor 181, the mode control switch 17, and the output 1822 of the control oscillator 182. The control switch 183 is responsive to a switch control signal generated by the mode control switch 17 when the mode control switch 17 switches operation of the recording module 11 from the CAV recording mode to the CLV recording mode so as to switch operation from a first state, where the wobble signal demodulator 152 is connected electrically to the frequency extractor 181 such that the control oscillator 182 provides the first write clock signal (a1) at the output 1822 thereof in response to the wobble sync signal (sync) from the wobble signal demodulator 152, to a second state, where the frequency extractor 181 is disconnected from the wobble signal demodulator 152 and is connected electrically to the output 1822 of the control oscillator 182 such that the control oscillator 182 provides a second write clock signal (a2) in response to the final first write clock signal (a1) at the output 1822 when the recording module 11 is switched to CLV recording mode by the mode control switch 17 from the CAV recording mode.

The processor unit 19 is coupled to the output 122 of the control oscillator 182 of the write clock signal generator 18, the mode control switch 17, and the reference clock signal generator 16. The processor unit 19 receives the first write clock signal (a1) from the write clock signal generator 18, and compares the first write clock signal (a1) with a threshold signal (ref2) from the reference clock signal generator 16 corresponding to a threshold recording speed in the CAV recording mode. It is noted that the reference clock signal (ref1) can be the same as the threshold signal (ref2) The processor unit 19 forces the mode control switch 17 to switch operation of the recording module 11 to the CLV recording mode by outputting a force switch control signal (force_sw) to the mode control switch 17 when result of the comparison performed by the processor unit 19 indicates that the recording mode should be switched to the CLV recording mode but the mode control switch still keep the recording module staying in the CAV recording mode as a result of a poor reproduced wobble signal or unstable rotation speed of the spindle motor 110.

The encoding unit 14 is coupled to the processor unit 19 and serves to encode the input data to be recorded from a computer main module 21 in a conventional manner.

Figure 3:
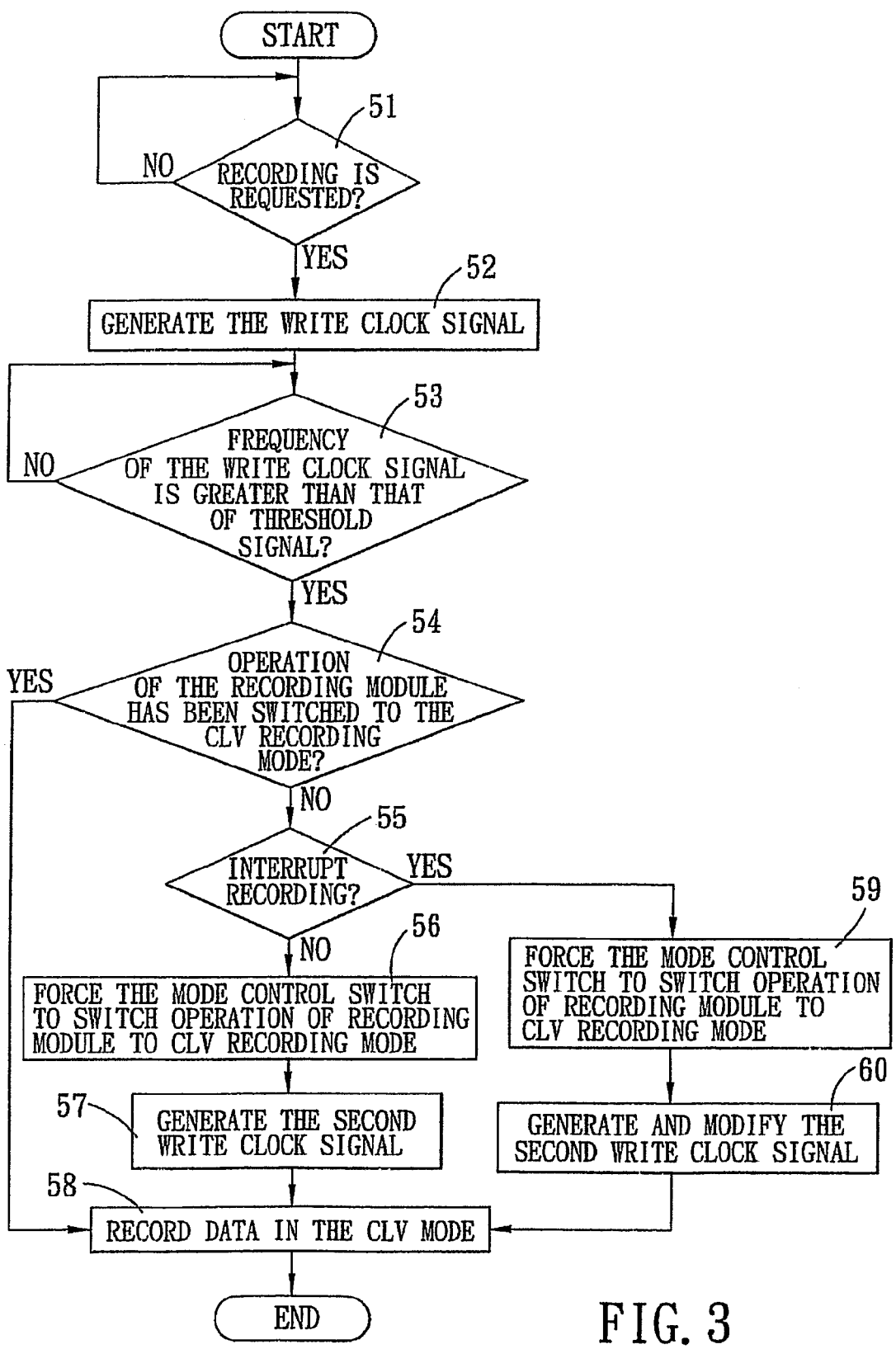
FIG. 3 is a flow chart illustrating how the optical recording system records data to a recording medium in accordance with the method of the preferred embodiment.

Referring to FIG. 3, there is shown a flow chart to illustrate how the optical recording system 1 records data to the recording medium 20 in accordance with the method of the preferred embodiment. In step 51, the processor unit 19 judges whether a recording request is received thereby. If no, step 51 is repeated. In step 52, when the processor unit 19 receives a recording request, the mode control switch 17 enables the recording module 10 to operate in the CAV recording mode, the write clock signal generator 18 generates the first write clock signal (a1) from the wobble sync signal (sync), and outputs the first write clock signal (a1) to the processor unit 19. In step 53, the processor unit 19 compares the first write clock signal (a1) with the threshold signal (ref2), and determines whether the frequency of the first write clock signal (a1) is greater than that of the threshold signal (ref2). If no, step 53 is repeated. In step 54, when the first write clock signal (a1) has a frequency greater than that of the threshold signal (ref2) (i.e., the current recording speed in the CAV recording mode has reached or even exceeded the threshold recording speed), the processor unit 19 judges whether operation of the recording module 10 has been switched to the CLV recording mode or not by the mode control switch 17. In the affirmative, data recording is continued in the CLV recording mode in step 58. In step 55, the processor unit 19 determines whether data recording should be interrupted in accordance with preset conditions. In step 56, when data recording should not be interrupted, the processor unit 19 forces the mode control switch 17 to switch operation of the recording module 10 to the CLV recording mode directly. In step 57, the write clock signal generator 18 generates the second write clock signal (a2) the same as the final first write clock signal (a1) when the recording module 11 is switched to CLV recording mode by the mode control switch 17 from the CAV recording mode.

Figure 4:
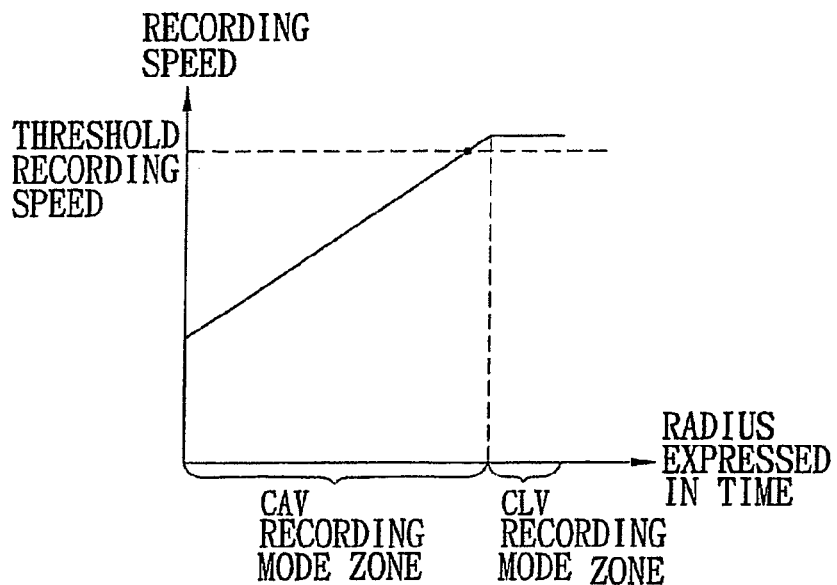
FIGS. 4 and 5 show graphs of recording speed when recording data in accordance with the method of the preferred embodiment.
Figure 5:
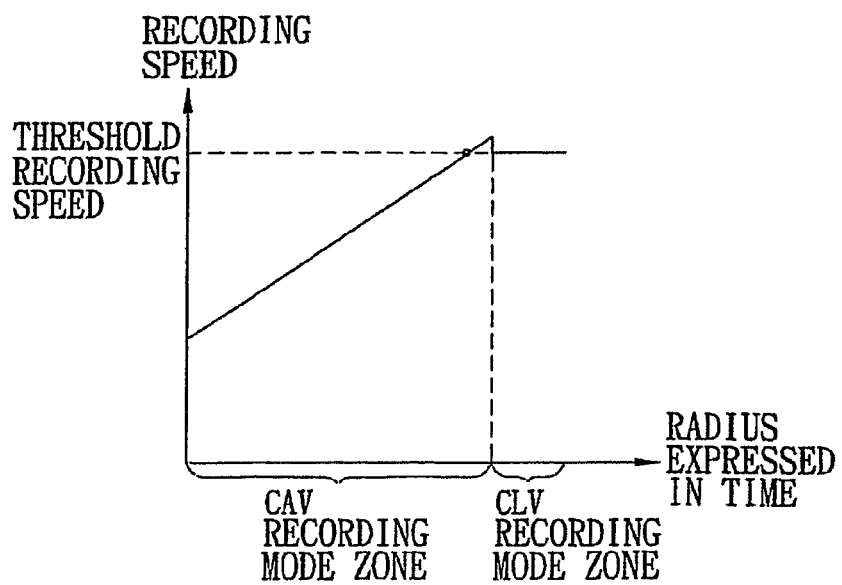

In this case, the second write clock signal (a2) has a frequency greater than that of the threshold signal (ref2) such that the recording speed in the CLV recording mode is larger than the threshold recording speed in the CAV recording mode, as shown in FIG. 4. In step 59, after data recording procedure is interrupted, the processor unit 19 forces the mode control switch 17 to switch operation of the recording module 10 to the CLV recording mode. In step 60, the write clock signal generator 18 generates the second write clock signal (a2), and modifies the second write clock signal (a2) to have a frequency equal to that of the threshold signal (ref2) such that the recording speed in the CLV recording mode is equal to the threshold recording speed in the CAV recording mode, as shown in FIG. 5.

By virtue of the switch control mechanism in the optical recording system of this invention, precise changing from the CAV recording mode to the CLV recording mode can be ensured even when a poor wobble signal is reproduced or when there is unstable rotation of the spindle motor 110.

While the present invention has been described in connection with what is considered the most practical and preferred embodiment, it is understood that this invention is not limited to the disclosed embodiment but is intended to cover various arrangements included within the spirit and scope of the broadest interpretation so as to encompass all such modifications and equivalent arrangements.

We claim:

1. An optical recording system comprising:
   a recording module for recording input data to a recording medium;
   a wobble signal generator adapted for reproducing a wobble signal associated with a physical track of the recording medium being recorded with the input data by said recording module;
   a wobble signal demodulator coupled to said wobble signal generator for demodulating the wobble signal so as to obtain a wobble sync signal therefrom;
   a mode control switch coupled to said recording module and said wobble signal demodulator, said mode control switch being operable so as to switch operation of said recording module from a default constant angular velocity (CAV) recording mode to a constant linear velocity (CLV) recording mode in accordance with the wobble sync signal from said wobble signal demodulator;
   a write clock signal generator coupled to said wobble signal demodulator for receiving the wobble sync signal therefrom, said write clock signal generator being further coupled to said mode control switch and generating a first write clock signal from the wobble sync signal when said recording module is operated by said mode control switch in the CAV recording mode; and
   a processor unit coupled to said write clock signal generator and said mode control switch,
   said processor unit receiving the first write clock signal and comparing the first write clock signal with a threshold signal corresponding to a threshold recording speed in the CAV recording mode,
   said processor unit forcing said mode control switch to switch operation of said recording module to the CLV recording mode when result of the comparison performed by said processor unit indicates that the recording mode should be switched to the CLV recording mode but said mode control switch still keep said recording module staying in the CAV recording mode.

2. The optical recording system as claimed in claim 1, wherein said write clock signal generator generates a second write clock signal when said recording module is operated by said mode control switch in the CLV recording mode.

3. The optical recording system as claimed in claim 2, wherein said write clock signal generator includes:
  a frequency extractor;
  a control oscillator having an input coupled to said frequency extractor, and an output coupled to said processor unit; and
  a control switch coupled to said wobble signal demodulator, said frequency extractor, said mode control switch, and said output of said control oscillator;
  said control switch being responsive to a switch control signal generated by said mode control switch when said mode control switch switches operation of said recording module from the CAV recording mode to the CLV recording mode so as to switch operation from a first state, where said wobble signal demodulator is connected electrically to said frequency extractor such that said control oscillator provides the first write clock signal at said output thereof in response to the wobble sync signal from said wobble signal demodulator, to a second state, where said frequency extractor is disconnected from said wobble signal demodulator and is connected electrically to said output of said control oscillator such that said control oscillator provides the second write clock signal at said output thereof when said recording module is operated by said mode control switch in the CLV recording mode.

4. An optical recording method comprising the steps of:
  (a) operating a recording module in a default constant angular velocity (CAV) recording mode for recording input data to a recording medium;
  (b) reproducing a wobble signal associated with a physical track of the recording medium being recorded with the input data by the recording module;
  (c) demodulating the wobble signal so as to obtain a wobble sync signal therefrom;
  (d) enabling a mode control switch to switch operation of the recording module from the CAV recording mode to a constant linear velocity (CLV) recording mode in accordance with the wobble sync signal;
  (e) generating a first write clock signal from the wobble sync signal when the recording module is operated by the mode control switch in the CAV recording mode; and
  (f) comparing the first write clock signal with a threshold signal corresponding to a threshold recording speed in the CAV recording mode, and forcing the mode control switch to switch operation of the recording module to the CLV recording mode when result of the comparison performed in step (f) indicates that the recording mode should be switched to the CLV recording mode but the mode control switch still keep the recording module staying in the CAV recording mode.

5. The optical recording method as claimed in claim 4, further comprising the step of:
  (g) generating a second write clock signal from the first write clock signal when the operation of the recording module is switched from the CAV recording mode to the CLV recording mode.

6. A switch controller for an optical recording system that includes
  a recording module for recording input data to a recording medium,
  a wobble signal generator for reproducing a wobble signal associated with a physical track of the recording medium being recorded with the input data by the recording module,
  a wobble signal demodulator coupled to the wobble signal generator for demodulating the wobble signal so as to obtain a wobble sync signal therefrom, and
  a mode control switch coupled to the recording module and the wobble signal demodulator, the mode control switch being operable so as to switch operation of the recording module from a default constant angular velocity (CAV) recording mode to a constant linear velocity (CLV) recording mode in accordance with the wobble sync signal from the wobble signal demodulator,
  said switch controller comprising:
  a write clock signal generator adapted to receive the wobble sync signal from the wobble signal demodulator, said write clock signal generator being adapted to be coupled to the mode control switch, and generating a write clock signal from the wobble sync signal when the recording module is operated by the mode control switch in the CAV recording mode; and
  a processor unit coupled to said write clock signal generator and adapted to be coupled to the mode control switch,
  said processor unit receiving the write clock signal and comparing the write clock signal with a threshold signal corresponding to a threshold recording speed in the CAV recording mode,
  said processor unit being adapted to force the mode control switch to switch operation of the recording module to the CLV recording mode when result of the comparison performed by said processor unit indicates that the recording mode should be switched to the CLV recording mode but the mode control switch still keep the recording module staying in the CAV recording mode.

7. A switch control method for an optical recording system that includes
  a recording module for recording input data to a recording medium,
  a wobble signal generator for reproducing a wobble signal associated with a physical track of the recording medium being recorded with the input data by the recording module,
  a wobble signal demodulator coupled to the wobble signal generator for demodulating the wobble signal so as to obtain a wobble sync signal therefrom, and
  a mode control switch coupled to the recording module and the wobble signal demodulator, the mode control switch being operable so as to switch operation of the recording module from a default constant angular velocity (CAV) recording mode to a constant linear velocity (CLV) recording mode in accordance with the wobble sync signal from the wobble signal demodulator,
  said switch control method comprising the steps of:
  (1) generating a write clock signal from the wobble sync signal when the recording module is operated by the mode control switch in the CAV recording mode; and
  (2) comparing the write clock signal with a threshold signal corresponding to a threshold recording speed in the CAV recording mode, and forcing the mode control switch to switch operation of the recording module to the CLV recording mode when result of the comparison performed in step (2) indicates that the recording mode should be switched to the CLV recording mode but the mode control switch still keep the recording module staying in the CAV recording mode.

8. An optical recording system comprising:

a recording module for recording input data to a recording medium;

a wobble signal generator adapted for reproducing a wobble signal of the recording medium;

a wobble signal demodulator coupled to said wobble signal generator for demodulating the wobble signal so as to obtain a wobble sync signal therefrom;

a mode control switch coupled to said recording module and said wobble signal demodulator, said mode control switch being operable so as to switch operation of said recording module from a default constant angular velocity (CAV) recording mode to a constant linear velocity (CLV) recording mode in accordance with the wobble sync signal;

a write clock signal generator coupled to said wobble signal demodulator for receiving the wobble sync signal therefrom, said write clock signal generator being further coupled to said mode control switch and generating a first write clock signal from the wobble sync signal when said recording module is operated by said mode control switch in the CAV recording mode; and a processor unit coupled to said write clock signal generator and said mode control switch, wherein said processor unit receiving the first write clock signal and comparing the first write clock signal with a threshold signal corresponding to a threshold recording speed in the CAV recording mode, said processor unit interrupting data recording and forcing said mode control switch to switch operation of said recording module to the CLV recording mode when result of the comparison performed by said processor unit indicates that the recording module should be interrupted for switching to the CLV recording mode.

9. An optical recording method comprising the steps of:

operating a recording module in a default constant angular velocity (CAV) recording mode for recording input data to a recording medium;

reproducing a wobble signal associated with a physical track of the recording medium being recorded with the input data by the recording module;

demodulating the wobble signal so as to obtain a wobble sync signal therefrom;

enabling a mode control switch to switch operation of the recording module from the CAV recording mode to a constant linear velocity (CLV) recording mode in accordance with the wobble sync signal;

generating a first write clock signal from the wobble sync signal when the recording module is operated by the mode control switch in the CAV recording mode;

comparing the first write clock signal with a threshold signal corresponding to a threshold recording speed in the CAV recording mode; and interrupting data recording and forcing the mode control switch to switch operation of the recording module to the CLV recording mode when result of the comparison indicates that the recording module should be interrupted for switching to the CLV recording mode.

* * * * *